(12) United States Patent
Hannan et al.

(10) Patent No.: US 11,463,884 B2
(45) Date of Patent: Oct. 4, 2022

(54) METHOD AND SYSTEM FOR DETERMINING AN INTERFERENCE CONTRIBUTION FROM A TIME DIVISION DUPLEXING SYSTEM

(71) Applicant: CommScope Technologies LLC, Hickory, NC (US)

(72) Inventors: Ariful Hannan, Sterling, VA (US); Raina Rahman, Herndon, VA (US); Navin Srinivasan, Fairfax, VA (US)

(73) Assignee: CommScope Technologies LLC, Hickory, NC (US)

( * ) Notice: Subject to any disclaimer, the term of this patent is extended or adjusted under 35 U.S.C. 154(b) by 52 days.

(21) Appl. No.: 16/507,965

(22) Filed: Jul. 10, 2019

(65) Prior Publication Data

US 2020/0053569 A1 Feb. 13, 2020

Related U.S. Application Data

(60) Provisional application No. 62/718,264, filed on Aug. 13, 2018.

(51) Int. Cl.
*H04W 16/14* (2009.01)
*H04W 12/06* (2021.01)
(Continued)

(52) U.S. Cl.
CPC .......... *H04W 16/14* (2013.01); *H04B 17/336* (2015.01); *H04L 5/1469* (2013.01); *H04W 12/06* (2013.01); *H04W 24/10* (2013.01)

(58) Field of Classification Search
CPC ..... H04W 16/14; H04W 12/06; H04W 24/10; H04W 72/0446; H04W 72/082;
(Continued)

(56) References Cited

U.S. PATENT DOCUMENTS 6,473,624 B1 10/2002 Corbett et al.
9,848,393 B2 * 12/2017 Xu .................. H04W 52/06
(Continued)

FOREIGN PATENT DOCUMENTS

EP         2958357 A1    12/2015
KR   1020160040624 A    4/2016
(Continued)

OTHER PUBLICATIONS

Wireless Innovation Forum, "Requirements for Commercial Operation in the U.S. 3550-3700 MHz Citizens broadband Radio Service Band Version V1.5.0", CBRS WInnForum Standards, May 1, 2018, pp. 1-77, The Software Defined Radio Forum Inc.
(Continued)

*Primary Examiner* — Steven H Nguyen
(74) *Attorney, Agent, or Firm* — Fogg & Powers LLC (57) ABSTRACT

Techniques are provided for more accurately determining interference contribution at a point in a neighborhood of a time division duplexing (TDD) system operating in shared frequency spectrum. If at least one TDD radio, of a TDD system, is in the neighborhood, then determine a largest interference level, at the point in the shared frequency spectrum, by a TDD radio of the TDD system, where the TDD radio is in the region around the point. The largest interference level is selected as the aggregate interference contribution of the TDD system for interference analysis in the shared spectrum at the point.

17 Claims, 5 Drawing Sheets

(51) Int. Cl.
*H04B 17/336* (2015.01)
*H04W 24/10* (2009.01)
*H04L 5/14* (2006.01)

(58) Field of Classification Search
CPC ... H04W 24/08; H04B 17/336; H04B 17/102; H04L 5/1469; H04L 5/0073
See application file for complete search history.

(56) References Cited

U.S. PATENT DOCUMENTS

| | | | |
|---|---|---|---|
| 2004/0192360 | A1 | 9/2004 | Tsai et al. |
| 2008/0069039 | A1 | 3/2008 | Li et al. |
| 2013/0130707 | A1 | 5/2013 | Tarokh et al. |
| 2015/0036509 | A1* | 2/2015 | Lopes ............... H04W 24/10 370/241.1 |
| 2015/0326463 | A1 | 11/2015 | Solondz |
| 2015/0373726 | A1 | 12/2015 | Zhao et al. |
| 2017/0170888 | A1 | 6/2017 | Yrjola et al. |
| 2017/0188241 | A1* | 6/2017 | Mueck ............... H04W 16/10 |
| 2017/0188314 | A1* | 6/2017 | Mueck ............... H04W 24/02 |
| 2017/0208454 | A1* | 7/2017 | Knisely ............... H04W 28/16 |
| 2017/0223638 | A1 | 8/2017 | Lopes et al. |
| 2017/0243139 | A1 | 8/2017 | Dzierwa et al. |
| 2017/0295497 | A1* | 10/2017 | Macmullan ........... H04W 16/14 |
| 2017/0295578 | A1 | 10/2017 | Khoshnevisan et al. |
| 2017/0318470 | A1* | 11/2017 | Srikanteswara ...... H04W 16/14 |
| 2017/0332243 | A1 | 11/2017 | Macmullan et al. |
| 2018/0014304 | A1 | 1/2018 | Khoshnevisan et al. |
| 2018/0132249 | A1 | 5/2018 | Mueck et al. |
| 2018/0316416 | A1 | 11/2018 | Reis et al. |
| 2019/0081690 | A1 | 3/2019 | Mueck et al. |
| 2019/0115950 | A1* | 4/2019 | Kakinada ............. H04B 1/7136 |
| 2019/0120969 | A1 | 4/2019 | Hamzeh et al. |
| 2019/0150134 | A1* | 5/2019 | Kakinada ............. H04W 72/048 370/330 |
| 2019/0215698 | A1* | 7/2019 | Balachandran ... H04W 72/0453 |
| 2019/0335336 | A1* | 10/2019 | Cimpu ............... H04W 16/14 |
| 2019/0373615 | A1* | 12/2019 | Cimpu ............... H04L 27/0006 |
| 2020/0052871 | A1 | 2/2020 | Hannan et al. |
| 2020/0053669 | A1 | 2/2020 | Hannan et al. |
| 2020/0162929 | A1 | 5/2020 | Cimpu et al. |

FOREIGN PATENT DOCUMENTS

| | | | | |
|---|---|---|---|---|
| WO | 2016033049 | A1 | 3/2016 | |
| WO | WO-2016033049 | A1 * | 3/2016 | ............ H04W 16/14 |
| WO | 2018139714 | A1 | 8/2018 | |

OTHER PUBLICATIONS

Wireless Innovation Forum, "Requirements for Commercial Operation in the U.S. 3550-3700 MHz Citizens broadband Radio Service Band Version V1.7.0", CBRS WInnForum Standards, May 6, 2019, pp. 1-80, The Software Defined Radio Forum Inc.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211, V15.7.0, Sep. 2019, pp. 1-239, 3rd Generation Partnership Project.

Drocella et al., "3.5 GHz Exclusion Zone Analyses and Methodology", NTIA Report 15-517, Mar. 2016, pp. 1-103, U.S. Department of Commerce.

Hufford, "The ITS Irregular Terrain Model, version 1.2.2 The Algorithm", National Telecommunications and Information Administration, Institute for Telecommunication Sciences, 2002, pp. 1-18, Boulder, CO.

International Searching Authority, "International Search Report and Written Opinion from PCT Application No. PCT/US2019/046190", from Foreign Counterpart to U.S. Appl. No. 16/538,459, dated Nov. 28, 2019, pp. 1-11, Published: WO.

Wif, "Requirements for Commercial Operation in the U.S. 3550-3700 MHz Citizens Broadband Radio Service Band", Version V1.4.1, Jan. 16, 2018, pp. 1-77, The Software Defined Radio Forum, Inc.

Wif, "Requirements for Commercial Operation in the U.S. 3550-3700 MHz Citizens Broadband Radio Service Band", Version V2.0.0, Feb. 3, 2017, pp. 1-73, The Software Defined Radio Forum Inc.

Wif, "Signaling Protocols and Procedures for Citizens Broadband Radio Service (CBRS): Spectrum Access System (SAS)—Citizens Broadband Radio Service Device (CBSD) Interface Technical Specification", Version V1.2.1, Mar. 31, 2018, pp. 1-60, The Software Defined Radio Forum Inc.

U.S. Patent and Trademark Office, "Notice of Allowance", U.S. Appl. No. 16/538,506, dated Jul. 22, 2020, pp. 1 through 20, Published: US.

International Searching Authority, "International Search Report and Written Opinion from PCT Application No. PCT/US2019/043253", from Foreign Counterpart to U.S. Appl. No. 16/507,965, dated Nov. 13, 2019, pp. 1-11, Published: WO.

U.S. Patent and Trademark Office, "Office Action", U.S. Appl. No. 16/538,459, dated Mar. 30, 2021, pp. 1 through 41, Published: US.

Miller, "Understand How to Consider Antennas for CBRS Applications", Microwaves & RF, Sep. 28, 2017, pp. 1 through 19, https://www.mwrf.com/technologies/components/article/21848679/understand-how-to-consider-antennas-for-cbrs-applications.

U.S. Patent and Trademark Office, "Notice of Allowance", U.S. Appl. No. 16/538,459, dated Sep. 30, 2021, pp. 1 through 19, Published: US.

European Patent Office, "Extended European Search Report from EP Application No. 19849082.3", from Foreign Counterpart to U.S. Appl. No. 16/507,965, dated Apr. 19, 2022, pp. 1 through 5, Published: EP.

European Patent Office, "Communication pursuant to Article 63(1) from EP Application No. 19849201.9", from Foreign Counterpart to U.S. Appl. No. 16/507,965, dated May 30, 2022, pp. 1 through 4, Published: EP.

* cited by examiner

METHOD AND SYSTEM FOR DETERMINING AN INTERFERENCE CONTRIBUTION FROM A TIME DIVISION DUPLEXING SYSTEM

CROSS-REFERENCE TO RELATED APPLICATIONS

The present application claims benefit of U.S. Patent Application Ser. No. 62/718,264, filed Aug. 13, 2018; the entire contents of the aforementioned patent application are incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of citizens broadband radio service device(s) (CBSD (s)), such as base station(s), e.g. that would facilitate communications with user equipment (or end user devices (EUDs). CBSD may be referred to more generally herein as a radio. The system's CBSDs would be coupled to other networks, such as the Internet, e.g. by a core network.

In a shared spectrum usage system, incumbent users for example government systems (e.g. shipborne radar) and priority access licensee ("PAL'") systems are protected from interference from CBSDs of general authorized access ("GAA") users. The incumbent users are located in protection zones comprising one or more protection points. Protection zones may otherwise referred to as protection regions. Receivers of environmental sensing capability (ESC) systems are also protected from interference from CBSDs, and are designated as protection points. Aggregate interference (in frequency spectrum on which the incumbent user system receives) at a protection point, from CBSDs in a neighborhood surrounding the protection point, must not exceed a threshold level. The threshold level may be set by law, regulation, or standards of a standards body (e.g. the WInnForum).[1] The neighborhood is an area around protection point whose size may vary depending upon the type of incumbent system being protected. For example, for a fixed satellite service the neighborhood is circular and has a radius of about one fifty kilometers. WInnForum SAS general requirement (requirement) R2-SGN-16 of WINNF-TS-0112 defines the neighborhood of protection points.

[1] For CBRS, the following aggregate interference levels are applicable. For PAL systems and grandfathered wireless protection zones, the aggregate interference can not exceed −80 dBm/10 MHz. For fixed satellite service (FSS) systems the aggregate interference cannot exceed −129 dBm/MHz for co-channel interference. For environmental sensing capability (ESC) systems, the aggregate interference cannot exceed −109 dBm/MHz.

Aggregate interference at a protection point may be determined as follows. The path loss between each CBSD (in the corresponding neighborhood) and a protection point is determined for a frequency spectrum. Knowing the effective radiated power at the frequency spectrum of each CBSD in the neighborhood, the corresponding interference contributed by each CBSD is determined. The interference contributions at the protection point of each CBSD are then summed. Requirement R2-SGN-16 also defines an Iterative Allocation Process (IAP) method of allocating interference margin fairly to CBSD when in the neighborhood.

The CBSDs are part of a shared access system ("SAS"). A SAS controller, of a SAS, regulates, e.g. the number and transmit power emissions of CBSDs that operate in frequency spectrum in the neighborhood.

The SAS controller limits the transmission power of CBSDs operating in a neighborhood that are associated with the SAS. The SAS will allow the CBSD(s) to operate in the frequency spectrum in a neighborhood such that the aggregate level of interference at a protection point will not exceed the threshold level. Requirement R2-SGN-16 also defines the Iterative Allocation Process method of allocating interference margin fairly to CBSD for CBSDs in a neighborhood.

GAA user CBSD systems typically comprise at least one access point communicatively coupled to one or more user equipment ("UE"). Typically, the user equipment are communications devices that emit relatively low power levels, e.g. smart phones, tablets, etc. Typically, the transmission power of the user equipment is limited, e.g. by law or standard, for example to 23 dBm/10 MHz. Because the transmission power of user equipment is relatively low and the location of the user equipment is below clutter level, emissions of each user equipment in a neighborhood can be ignored for purposes of interference analysis at a protection point; only the access point(s) are deemed CBSD(s) because their effective isotropic radiated power (EIRP) may be up to 47 dBm/10 MHz and their antenna height in most cases is above the clutter level. Therefore, such CBSD emissions are analyzed to determine aggregate interference at a protection point.

However, some GAA user CBSD systems include user equipment (UE) that is consumer premises equipment (CPE) for fixed wireless systems. Such consumer premises equipment has a significantly higher transmission power level, e.g. 23-47 dBm/10 MHz, than typical user equipment. Emissions of such consumer premises equipment in a neighborhood may not be below the clutter level for purposes of interference analysis at a protection point. Therefore, laws, rules, and/or standards require that such CPE user equipment be deemed CBSDs or CPE-CBSDs. The emissions of all CPE-CBSDs utilized to determine aggregate interference.

Typically, in a communications system with CPE(s) and access point(s) ("CPE system"), the CPE(s) and corresponding access point(s) (or base stations) operate using time division duplexing ("TDD"). As a result, generally only one consumer premises equipment or one access point transmits in a channel at a given time period. Notwithstanding such operation, the WInnForum standard[2] for SAS requires that not only each access point, but also each CPE, be treated as a CBSD for purposes of aggregate interference analysis at a protection point. However, this causes the SAS to operate inefficiently in terms of allocating transmission power to CBSDs.

[2] Release 1 standard WINNF-TS-00112 identifies power limit for an EUD and a CBSD in requirement R0-DEV-05. By this definition any device transmitting over 23 dBm is no longer considered an EUD. Since CPE will transmit more than 23 dBm hence by this definition CPE will be registered by a SAS as a CBSD. Requirement R2-SGN-16 describes limiting aggregate interference by controlling all CBSD transmission power When performing aggregate interference analysis when two or more access point(s) and CPE(s) of a TDD fixed wireless system are in a neighborhood of a protection point, the SAS accounts for the transmissions of the two or more access point(s) and CPE(s) of the CPE system when only one transmits during a given time period. As a result, the SAS controller determines an aggregate interference that is erroneously large, and unduly limits the number of CBSDs that the SAS controller authorizes to operate in the neighborhood and/or unduly restricts the transmission power of the CBSDs that the SAS authorizes to operate in the neighborhood. Therefore, there is a need for a more efficient technique to determine the interference contribution of transmitter(s) in a TDD system, e.g. CPE(s) and base station(s) in a TDD fixed wireless system.

SUMMARY OF THE INVENTION

A method is provided. The method comprises: generating a neighborhood around a point; determining whether there is at least one time domain duplexing (TDD) radio of at least one TDD system in the neighborhood, where the at least one TDD radio is either authorized, or is requesting authorization, to transmit in shared frequency spectrum; if at least one TDD radio is determined to be in the neighborhood, then determining a largest interference contribution, in the shared frequency spectrum at the point, for each TDD system having a TDD radio in the neighborhood; and wherein each largest interference contribution is used as an aggregate interference of a corresponding TDD system in the shared frequency spectrum at the point.

DETAILED DESCRIPTION

A technique for more accurately determining the interference contribution, in a SAS, of a TDD system at a protection point is described. The technique utilizes a maximum interference level in frequency spectrum at the protection point contributed by a TDD CBSD in a neighborhood of the protection point. Because this level is lower than the sum of an aggregate of interference emissions at the protection point of all TDD CBSDs of the TDD system in the neighborhood, the SAS can permit increased transmission power in the frequency spectrum by CBSDs in the neighborhood. Increased transmission power can result in more CBSDs being allowed to operate in the frequency spectrum in the neighborhood or that the transmission power (in the frequency spectrum) of the CBSDs in the neighborhood can be increased. The latter allows CBSDs, e.g. which are access points, to transmit further distances. Thus, the number of CBSDs required to provide coverage to an area can be reduced.

A TDD system means a communications system comprised of CBSDs, e.g. CPE(s) and access point(s), which operate using TDD on a frequency channel. With TDD, only one CBSD will transmits during a given time period. A TDD CBSD means a CBSD, e.g. CPE(s) and access point(s), which operate using TDD on a frequency channel.

Figure 1:
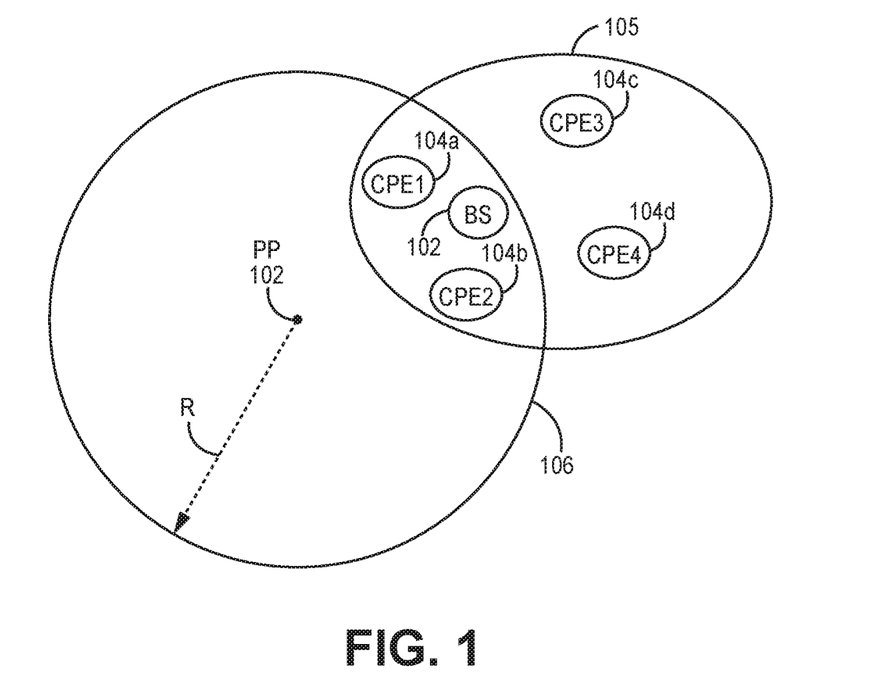
FIG. 1 illustrates an exemplary diagram illustrating a protection point proximate to a TDD system whose interference level is determined according to embodiments of the invention.

FIG. 1 illustrates an exemplary diagram illustrating a system comprising a protection point proximate to a TDD system whose interference level is determined according to embodiments of the invention. A neighborhood 106 surrounds a protection point 102. In this example, the protection point 102 may be the location of a fixed satellite service (FSS). The neighborhood 106 is a circular region centered on the protection point 102 and having a radius R. WInnForum standard defines neighborhood for protection points in Table 1 of requirement R2-SGN-16. However, in other embodiments, the neighborhood may have a non-circular shape, e.g. a shape of a polygon or an ellipse.

However, embodiments of the invention can be used with protection areas or zones (e.g. grandfathered wireless protection zones), exclusion zones (e.g. dynamic protection areas), or any region(s) for which contributions of TDD system(s) to aggregate interference analysis must be determined; such areas, zones, and regions (hereinafter collectively referred to as "regions") may comprise one or more protection points. A protection point may be more generally referred to a as a point. The aforementioned technique may have applicability to locations, e.g. points, other than protection points of a neighborhood.

However, the term point shall not mean other types of points such as an access point. Further, because the techniques exemplified herein can be used in systems other than a SAS, a CBSD may be more generally referred to as a radio. For pedagogical purposes, the term protection points and CBSDs is sometimes subsequently used in lieu of respectively the terms points and radios.

If a region includes more than one protection point, an analysis for each protection point is performed. Because the geographic location of the neighborhood may differ for each protection point, the CBSDs of a TDD system in each neighborhood may also vary. Thus, the power level at a given protection point contributed by the TDD system, as determined by embodiments of the invention, may also vary.

In the embodiment illustrated in FIG. 1, a TDD system 105 has three CBSDs (a base station (BS) 102, a first CPE (CPE1) 104a, and a second CPE (CPE2) 104b) located within the neighborhood 106. Alternatively, the TDD system 105 could have another number of CBSDs, e.g. one, two, four, etc., in the neighborhood. The TDD system 105 is part of, and communicatively coupled to, a SAS.

Using the example illustrated in FIG. 1 for pedagogical purposes, the SAS (e.g. a SAS controller) determines the neighborhood 106 for the protection point 102. Then, knowing the location of the CBSDs of the TDD system 105, the SAS (e.g. a SAS controller) determines which CBSDs are within the neighborhood, e.g. within the border (or within and on the border) of the neighborhood. Then, the SAS (e.g. a SAS controller) determines the power levels, at the protection point, of the transmitted signals of the CBSDs at the protection point. For the TDD system, the SAS (e.g. a SAS controller) selects the highest power level at the protection point of any TDD CBSD (in the neighborhood) of the TDD system 105 for use as a contribution of the TDD system 105 to SAS's determination of aggregate interference at the protection point 102.

Figure 2:
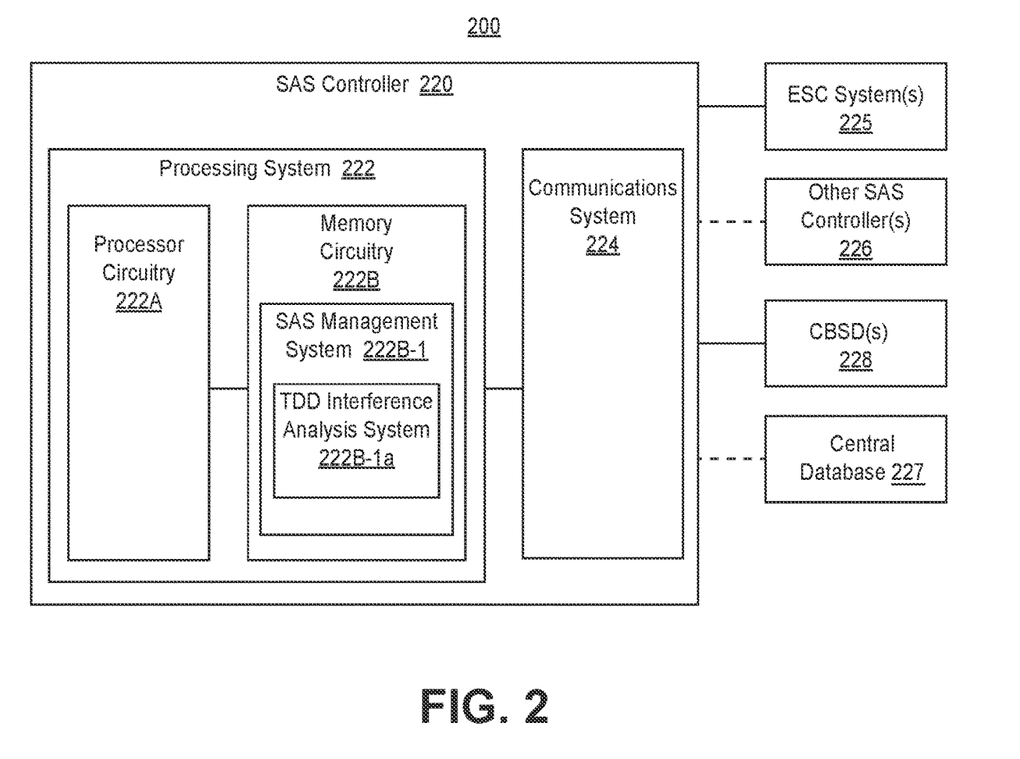
FIG. 2 illustrates one embodiment of a shared access system that is implemented according to embodiments of the invention.

FIG. 2 illustrates one embodiment of a SAS 200 that is implemented according to embodiments of the invention. The illustrated SAS 200 includes a SAS controller 220 coupled to one or more CBSDs (CBSD(s)) 228. Each CBSD is operated by a GAA user and/or a PAL.

In one embodiment, the SAS controller 220 may be coupled to at least one environmental sensing capability system (ESC system(s)) 225. In another embodiment, the SAS controller 220 is coupled to a central database 227, e.g. which has information about when certain incumbent users (such as satellite ground stations) and/or PALs are transmitting. In a further embodiment, the SAS controller 220 is coupled to at least one other SAS controllers (other SAS controller(s)) 226, e.g. controlling other CBSDs (of other SAS(s)) operating in the same or overlapping frequency spectrum. For example, such other CBSDs controlled by other SAS controller(s) 226 and their PALs, GAA users, and associated incumbent users may generate electromagnetic energy that overlaps the geographic region and frequency spectrum of the CBSDs 228 controlled by SAS 220, and thus must be accounted for by the SAS 220 when the SAS 220 performs interference analysis and authorizes operation of CBSD(s) 228 of the PAL(s) and/or the GAA user(s). Alternatively, the SAS controller 220 and its associated PALs, GAA users, and incumbent users may generate electromagnetic energy that overlaps the geographic region of the other SAS(s), and thus must be accounted for by the other SAS controller(s) 226 when the other SAS(s) perform interference analysis, and authorize operation of CBSDs of PALs and GAA users (associated with the other SAS controllers(s) 226). By coupling SAS controller(s) of SAS(s) that are geographically proximate to one another, each SAS controller can account for electromagnetic energy emitted from other SAS(s) in proximate geographies.

The ESC system 225 detects, and communicates to the SAS controller 220, the presence of signal(s), e.g. from some incumbent user(s), such as RADARs. Alternatively, incumbent users can inform the SAS controller 225 that they are operating, e.g. by transmitting a signal beacon, or communicating with the SAS controller 220 or the central database 227 which may be coupled to the SAS controller 220. Upon notification of operation of an incumbent user, the SAS controller 220, at least in part, models the propagation of transmissions of the CBSD(s) 228 and regulates the operation (e.g. power levels and frequencies of operation) of the CBSD(s) 228 to allow the incumbent user(s) to operate free of interference. The SAS controller 220 otherwise controls the operation (e.g. power levels and frequencies of operation) of the GAA user(s) so that CBSDs of GAA users and PAL(s) operate free of interference. Free of interference means that the level of interference is below a threshold level, which may not be zero, and may be determined by law, regulation, or standard.

In one embodiment, the SAS controller 220 includes a processing system 222 coupled to a communications system 224. The processing system 222 controls the operation of CBSD(s) 228 that form part of the SAS 200. The processing system 222 may also be referred to herein as processing circuitry.

The communications system 224 facilitates communications between the communications system 224 and other systems or devices, e.g. CBSD(s) 228, the ESC system(s) 125, the central database 227, and/or other SAS(s) 226. In one embodiment, the communications system 224 includes communications circuitry such as a modem, e.g. an Internet data modem, a radio, and/or any other communications device(s) that can facilitate communications to the aforementioned devices.

Optionally, the processing system 222 may be a state machine, e.g. comprised of processor circuitry 222A coupled to memory circuitry 222B. In the illustrated embodiment, the memory circuitry 222B includes a SAS management system 222B-1. In the illustrated embodiment, the SAS management system 222B-1 includes a TDD interference analysis system 222B-1a. The TDD interference analysis system 222B-1a determines the contribution to the aggregate interference at a protection point by each TDD systems in a corresponding neighborhood as further described herein. The SAS management system 222B-1 also includes techniques for generating neighborhoods around each protection point, and determining the aggregate level of interference at each protection point. To this end, the SAS management system 222B-1 may include propagation models (e.g. the irregular terrain model and/or the Hata model (or variations thereof)) with which to determine path loss between CBSDs and protection point(s). The SAS management system 222B-1 may also include a database of information about CBSDs (e.g. geographic location, height, terrain morphology, and/or effective radiated power information); additionally and/or alternatively, the SAS management system 222B-1 may obtain information (e.g. geographic location, height, terrain morphology, and/or effective radiated power information) from remote sources, e.g. the central database 227 or the other SAS controller(s) 226.

Figure 3:
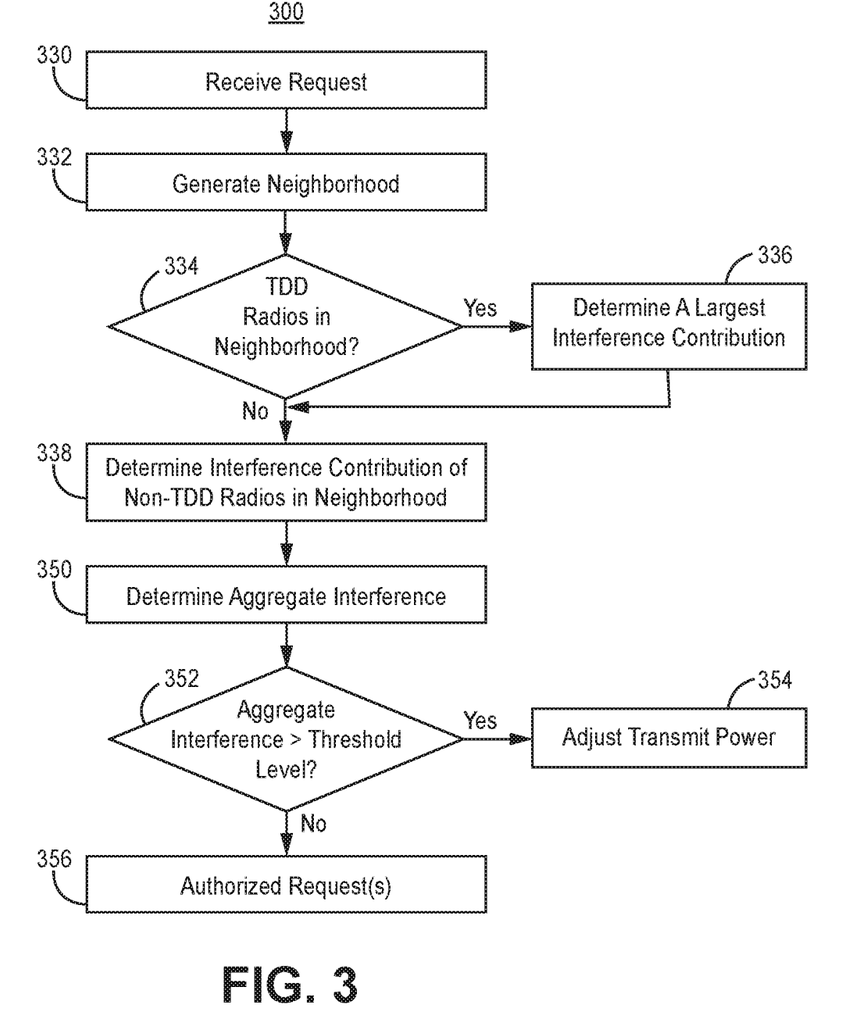
FIG. 3 illustrates one embodiment of a method of determining an aggregate interference at a protection point in the presence of a time division duplexing system.

FIG. 3 illustrates one embodiment of a method of determining the aggregate interference at a point in the presence of a TDD system 300. To the extent that the method 300 shown in FIG. 3 is described herein as being implemented in the systems shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 330, receive a request for evaluating protection criterion at a point after receiving one or more requests from radio(s) in a neighborhood around a point to transmit in shared frequency spectrum. The request may arise from one or more radios requesting to transmit in share frequency spectrum, e.g. controlled by a SAS controller. Alternatively, the request may be periodically issued (e.g. once or more per day), regardless of whether or not there has been request(s) from radio(s) to transmit in the shared frequency spectrum. The frequency spectrum, for example, may be used by a protected communications system, e.g. a fixed satellite service, at the point. In block 332, generate a neighborhood about the point, where, e.g., a location of a radio such as a receiver or transceiver.

In block 334, determine whether there is one or more TDD systems (transmitting in the shared frequency spectrum) that have at least one TDD radio (TDD radio(s)) located in the neighborhood. A SAS would know of the existence of TDD systems and the location of their radios; for example, such information may be stored in the SAS controller 220 of the SAS or the central database 227 communicatively coupled to the SAS controller of the SAS. If there is not at least one TDD radio in the region, then proceed to block 338 or optionally to block 350.

If there is one or more TDD radios (authorized or requesting authorization to transmit in the shared frequency spectrum) in the neighborhood, then in block 336 determine a largest interference contribution at a point, of a TDD radio (of each TDD system) in the region about the point. The largest interference contribution means the largest interference level by a TDD radio of a corresponding TDD system and in the shared frequency spectrum at the point, where the TDD radio is in the region around the point. The largest interference contribution at the point by such a TDD radio in the region and of a TDD system is used as the aggregate interference of the corresponding TDD system at the point. Block 336 may be implemented, e.g. as illustrated with respect to FIG. 4 or 5. Alternatively, the Upon completing block 336, proceed to block 338.

Optionally, in block 338, determine the contribution of interference of radios (transmitting in the frequency spectrum), which are not TDD radios, to the aggregate interference at the point. In block 350, determine the aggregate interference in the shared frequency spectrum at the point of TDD radios and non-TDD radios. This, for example, may be done by adding the interference levels determined in block 336 and possibly in block 338.

Then, optionally, in block 352, determine whether the determined aggregate interference (in the frequency spectrum) is greater than a threshold level. The threshold level may be set by law, regulation, and/or by a standard created by a standards body. If the aggregate interference is greater than the threshold level, then optionally in block 354 adjust a transmit power of transmitting radios in the neighborhood (e.g. using the IAP method) so that any adjustment to transmit power is fairly allocated amongst all transmitting radios in the neighborhood. Optionally, this may include terminating transmission of certain radios in the neighborhood, e.g. using a move list. Also, optionally, if the analysis was initiated at least in part by a request to transmit in the shared frequency spectrum, then optionally, reject the request. If the aggregate interference is less than or equal to the threshold level, then optionally in block 356, authorize request(s) of the requesting radio(s) to transmit at the requested power level(s).

Figure 4:
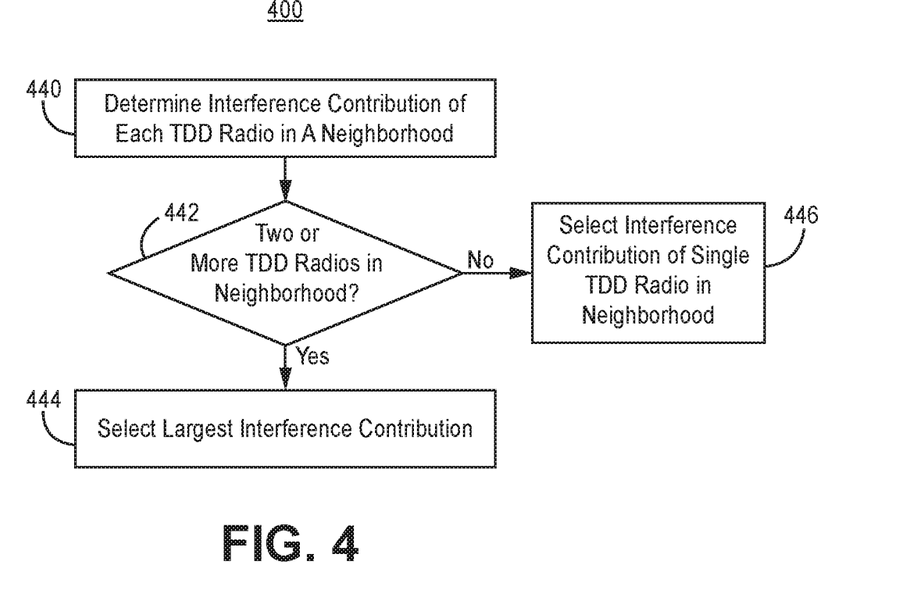
FIG. 4 illustrates one embodiment of a method of determining a contribution of a time division duplexing radio to aggregate interference.

FIG. 4 illustrates one embodiment of a method of determining a contribution of a TDD system to aggregate interference 400. FIG. 4 illustrates one embodiment of how to implement block 336. The method of FIG. 4 is performed for each TDD system having a radio in the neighborhood.

To the extent the method 400 shown in FIG. 4 is described herein as being implemented in the systems shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, determine an interference contribution in frequency spectrum at a point. The interference contribution is determined for each TDD radio, of the TDD system, in a neighborhood around a point. In block 442, determine if the TDD system has two or more TDD radios (transmitting in the frequency spectrum) in the neighborhood. In block 444, if the TDD system has two or more TDD radios (transmitting in the frequency spectrum) in the neighborhood, select a largest interference contribution (e.g. power level) in the frequency spectrum at the point, where the largest interference contribution corresponds to a TDD radio. Use the selected largest interference contribution as the interference contribution of the TDD system in the frequency spectrum and at the point. In block 446, if the TDD system has one TDD radio (transmitting in the frequency spectrum) in the neighborhood, then select the interference contribution of the one TDD radio, in the neighborhood and of the TDD system, as the interference contribution of the TDD system in the frequency spectrum and at the point. Use the selected interference contribution as the interference contribution of the TDD system in the frequency spectrum at the point.

Figure 5:
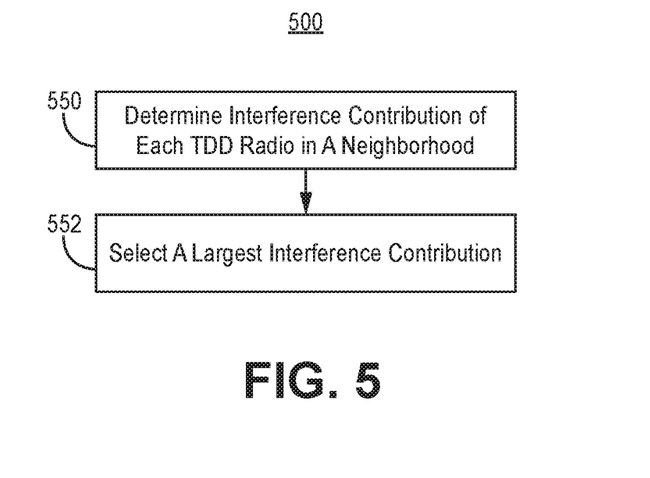
FIG. 5 illustrates another embodiment of a method of determining a contribution of a time division duplexing radio to aggregate interference.

FIG. 5 illustrates another embodiment of a method of determining a contribution of a TDD system to aggregate interference 500. FIG. 5 illustrates another embodiment of how to implement block 336. The method of FIG. 5 is performed for each TDD system having a radio in the neighborhood.

To the extent the method 500 shown in FIG. 5 is described herein as being implemented in the systems shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 550, determine an interference contribution in frequency spectrum at the point. The interference contribution is determined for each TDD radio, of a TDD system, in a neighborhood around a point. In block 552, select a largest interference contribution (e.g. power level) in the frequency spectrum at the point, where the larges interference contribution corresponds to a TDD radio, of the TDD system, in the neighborhood. Use the selected largest interference contribution as the interference contribution of the TDD system in the frequency spectrum and at the point.

Information about TDD radio transmit power may be obtained from a grant authorization to transmit in the shared frequency spectrum and/or from registration information provided by each TDD radio, e.g. group parameter, and effective isotropic radiated power, location, antenna height, beam width, and/or antenna azimuth. Each TTD radio in a TDD system shares a common group parameter.

Exemplary Embodiments

Example 1 includes a method comprising: generating a neighborhood around a point; determining whether there is at least one time domain duplexing (TDD) radio of at least one TDD system in the neighborhood, where the at least one TDD radio is either authorized, or is requesting authorization, to transmit in shared frequency spectrum; if at least one TDD radio is determined to be in the neighborhood, then determining a largest interference contribution, in the shared frequency spectrum at the point, for each TDD system having a TDD radio in the neighborhood; and wherein each largest interference contribution is used as an aggregate interference of a corresponding TDD system in the shared frequency spectrum at the point.

Example 2 includes the method of Example 1, further comprising: receiving a request from a radio to transmit in shared frequency spectrum; determining if the aggregate interference is greater than a threshold level; and if the aggregate interference is not greater than the threshold level, then authorizing the request.

Example 3 includes the method of any of Examples 1-2, wherein determining a largest interference contribution for a TDD system having a TDD radio in the neighborhood comprises: determining an interference contribution of each TDD radio of the TDD system in the neighborhood; and selecting a largest interference contribution of a TDD radio of the TDD system.

Example 4 includes the method of any of Examples 1-3, further comprising: if the aggregate interference is greater than the threshold level, then adjusting a transmit power of transmitting radios in the neighborhood.

Example 5 includes the method of any of Examples 1-4, wherein the point is a protection point in a protection region.

Example 6 includes the method of any of Examples 1-5, further comprising: determining an interference contribution in the frequency spectrum at the point of radios in the neighborhood that do not operate using TDD; and determining an aggregate interference in the frequency spectrum at the point by adding the interference contributions of each TDD system and the radios that do not operate using TDD.

Example 7 includes a program product comprising a non-transitory processor-readable medium on which program instructions, configured to be executed by a programmable processor, are embodied, wherein the program instructions are operable to: generate a neighborhood around a point; determine whether there is at least one time domain duplexing (TDD) radio of at least one TDD system in the neighborhood, where the at least one TDD radio is either authorized, or is requesting authorization, to transmit in shared frequency spectrum; if at least one TDD radio is determined to be in the neighborhood, then determine a largest interference contribution, in the shared frequency spectrum at the point, for each TDD system having a TDD radio in the neighborhood; and wherein each largest interference contribution is used as an aggregate interference of a corresponding TDD system in the shared frequency spectrum at the point.

Example 8 includes the program product of Example 7, wherein the program instructions are further operable to: receive a request from a radio to transmit in shared frequency spectrum; determine if the aggregate interference is greater than a threshold level; and if the aggregate interference is not greater than the threshold level, then authorize the request.

Example 9 includes the program product of any of Examples 7-8, wherein determining an interference contribution for a TDD system having a TDD radio in the neighborhood comprises: determine an interference contribution of each TDD radio of the TDD system in the neighborhood; and select a largest interference contribution of a TDD radio of the TDD system.

Example 10 includes the program product of any of Examples 7-9, wherein the program instructions are further operable to: if the aggregate interference is greater than the threshold level, then adjust a transmit power of transmitting radios in the neighborhood.

Example 11 includes the program product of any of Examples 7-10, wherein the point is a point in a protection region.

Example 12 includes the program product of any of Examples 7-11, wherein the program instructions are further operable to: determine an interference contribution in the frequency spectrum at the point of radios in the neighborhood that do not operate using TDD; and determine an aggregate interference in the frequency spectrum at the point by adding the interference contributions of each TDD system and the radios that do not operate using TDD.

Example 13 includes a shared access system (SAS), comprising: a SAS controller comprising processing circuitry coupled to a communications system; wherein the processing circuitry is configured to: generate a neighborhood around a point; determine whether there is at least one time domain duplexing (TDD) radio of at least one TDD system in the neighborhood, where the at least one TDD radio is either authorized, or is requesting authorization, to transmit in shared frequency spectrum; if at least one TDD radio is determined to be in the neighborhood, then determine a largest interference contribution, in the shared frequency spectrum at the point, for each TDD system having a TDD radio in the neighborhood; and wherein each largest interference contribution is used as an aggregate interference of a corresponding TDD system in the shared frequency spectrum at the point.

Example 14 includes the SAS of Example 13, wherein the processing circuitry is further configured to: receive a request from a radio to transmit in shared frequency spectrum; determine if the aggregate interference is greater than a threshold level; and if the aggregate interference is not greater than the threshold level, then authorize the request.

Example 15 includes the SAS of any of Examples 13-14, wherein determining an interference contribution for a TDD system having a TDD radio in the neighborhood comprises: determining an interference contribution of each TDD radio of the TDD system in the neighborhood; and selecting a largest interference contribution of a TDD radio of the TDD system.

Example 16 includes the SAS of any of Examples 13-15, wherein the processing circuitry is further configured to: if the aggregate interference is greater than the threshold level, then adjust a transmit power of transmitting radios in the neighborhood.

Example 17 includes the SAS of any of Examples 13-16, wherein the point is a point in a protection region.

Example 18 includes the SAS of any of Examples 13-17, wherein the processing circuitry is further configured to: determine an interference contribution in the frequency spectrum at the point of radios in the neighborhood that do not operate using TDD; and determine an aggregate interference in the frequency spectrum at the point by adding the interference contributions of each TDD system and the radios that do not operate using TDD.

Example 19 includes the SAS of any of Examples 13-18, wherein the SAS controller is communicatively coupled to at least one radio.

Example 20 includes the SAS of any of Examples 13-19, wherein the SAS controller is communicatively coupled to at least one of an environmental sensing capability system, a central database, and at least one other SAS controller.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

A processing system used in the present system and method can be implemented using software, firmware, hardware, or any appropriate combination thereof, as known to one of skill in the art. By way of example and not limitation, the processor circuitry 222A can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by processor circuitry 222A.

Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 222B illustrated herein. For example, the memory circuitry 222B may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

The invention claimed is:

1. A method, comprising:
generating a neighborhood around a protection point, wherein the protection point is a position where an aggregate interference from each radio located in the neighborhood should not exceed an interference threshold level;
determining whether there is at least one time domain duplexing (TDD) radio of at least one TDD system in the neighborhood, where the at least one TDD radio is either authorized, or is requesting authorization, to transmit in shared frequency spectrum;
determining that at least one TDD radio is in the neighborhood, then determining a largest interference contribution at the protection point, in the shared frequency spectrum, from a TDD radio of each TDD system comprising a TDD radio in the neighborhood, wherein each TDD system comprises at least two TDD radios, and wherein the largest interference contribution, at the protection point, is from one of the at least two TDD radios; and
wherein each largest interference contribution is used as an interference contribution of a corresponding TDD system in the shared frequency spectrum at the protection point.

2. The method of claim 1, wherein the neighborhood is circular.

3. The method of claim 1, wherein determining the largest interference contribution of each TDD system having a TDD radio in the neighborhood comprises:
determining an interference contribution of each TDD radio of each TDD system in the neighborhood; and
selecting a largest interference contribution of a TDD radio of each TDD system.

4. The method of claim 1, further comprising:
determining that the interference contribution is greater than a threshold level, then adjusting a transmit power of transmitting radios in the neighborhood.

5. The method of claim 1, further comprising:
determining an interference contribution in the shared frequency spectrum at the protection point of radios in the neighborhood that do not operate using TDD; and
determining an aggregate interference in the shared frequency spectrum at the protection point by adding the interference contribution of each TDD system and the radios that do not operate using TDD.

6. A program product comprising a non-transitory processor-readable medium on which program instructions, configured to be executed by a programmable processor, are embodied, wherein the program instructions are operable to:
generate a neighborhood around a protection point, wherein the protection point is a position where an aggregate interference from each radio located in the neighborhood should not exceed an interference threshold level;
determine whether there is at least one time domain duplexing (TDD) radio of at least one TDD system in the neighborhood, where the at least one TDD radio is either authorized, or is requesting authorization, to transmit in shared frequency spectrum;
determine that at least one TDD radio is in the neighborhood, then determine a largest interference contribution at the protection point, in the shared frequency spectrum, from a TDD radio of each TDD system comprising a TDD radio in the neighborhood, wherein each TDD system comprises at least two TDD radios, and wherein the largest interference contribution, at the protection point, is from one of the at least two TDD radios; and
wherein each largest interference contribution is used as an interference contribution of a corresponding TDD system in the shared frequency spectrum at the protection point.

7. The program product of claim 6, wherein the neighborhood is circular.

8. The program product of claim 6, wherein determining the largest interference contribution of each TDD system having a TDD radio in the neighborhood comprises:
determine an interference contribution of each TDD radio of each TDD system in the neighborhood; and
select a largest interference contribution of a TDD radio of each TDD system.

9. The program product of claim 6, wherein the program instructions are further operable to:
determine that the interference contribution is greater than a threshold level, then adjust a transmit power of transmitting radios in the neighborhood.

10. The program product of claim 6, wherein the program instructions are further operable to:
determine an interference contribution in the shared frequency spectrum at the protection point of radios in the neighborhood that do not operate using TDD; and
determine an aggregate interference in the shared frequency spectrum at the protection point by adding the interference contribution of each TDD system and the radios that do not operate using TDD.

11. A shared access system (SAS), comprising:
a SAS controller comprising processing circuitry coupled to a communications system;
wherein the processing circuitry is configured to:
generate a neighborhood around a protection point, wherein the protection point is a position where an aggregate interference from each radio located in the neighborhood should not exceed an interference threshold level;
determine whether there is at least one time domain duplexing (TDD) radio of at least one TDD system in the neighborhood, where the at least one TDD radio is either authorized, or is requesting authorization, to transmit in shared frequency spectrum;

determine that at least one TDD radio is in the neighborhood, then determine a largest interference contribution at the protection point, in the shared frequency spectrum, from a TDD radio of each TDD system comprising a TDD radio in the neighborhood, wherein each TDD system comprises at least two TDD radios, and wherein the largest interference contribution, at the protection point, is from one of the at least two TDD radios; and wherein each largest interference contribution is used as an interference contribution of a corresponding TDD system in the shared frequency spectrum at the protection point.

12. The SAS of claim 11, wherein the neighborhood is circular.

13. The SAS of claim 11, wherein determining the largest interference contribution of each TDD system having a TDD radio in the neighborhood comprises:

determining an interference contribution of each TDD radio of each TDD system in the neighborhood; and selecting a largest interference contribution of a TDD radio of each TDD system.

14. The SAS of claim 11, wherein the processing circuitry is further configured to:

if the interference contribution is greater than a threshold level, then adjust a transmit power of transmitting radios in the neighborhood.

15. The SAS of claim 11, wherein the processing circuitry is further configured to:

determine an interference contribution in the shared frequency spectrum at the protection point of radios in the neighborhood that do not operate using TDD; and determine an aggregate interference in the shared frequency spectrum at the protection point by adding the interference contribution of each TDD system and the radios that do not operate using TDD.

16. The SAS of claim 11, wherein the SAS controller is communicatively coupled to at least one radio.

17. The SAS of claim 11, wherein the SAS controller is communicatively coupled to at least one of an environmental sensing capability system, a central database, and at least one other SAS controller.

* * * * *